(12) United States Patent
Eguchi et al.

(10) Patent No.: US 6,266,519 B1
(45) Date of Patent: Jul. 24, 2001

(54) RECEIVER

(75) Inventors: Shoko Eguchi, Kanagawa; Makoto Sasaki, Chiba, both of (JP)

(73) Assignee: Sony Corporation, Tokyo (JP)

( * ) Notice: Subject to any disclaimer, the term of this patent is extended or adjusted under 35 U.S.C. 154(b) by 0 days.

(21) Appl. No.: 09/294,377

(22) Filed: Apr. 20, 1999

(30) Foreign Application Priority Data

Apr. 24, 1998 (JP) .................................................. 10-114942

(51) Int. Cl.⁷ ................................. H04B 1/18; H04B 1/16
(52) U.S. Cl. ............................ 455/185.1; 455/179.1; 455/182.3; 455/186.1; 455/186.2
(58) Field of Search .......................... 455/185.1, 186.1, 455/186.2, 161.2, 161.3, 166.2, 179.1, 180.1, 182.3, 183.2, 187.1, 188.1

(56) References Cited

U.S. PATENT DOCUMENTS

| | | | |
|---|---|---|---|
| 5,682,147 | * 10/1997 | Eaton et al. | 455/186.1 |
| 5,734,973 | * 3/1998 | Honda | 455/186.1 |
| 5,740,518 | * 4/1998 | Takashima et al. | 455/186.1 |
| 5,752,177 | * 5/1998 | Siegle et al. | 455/186.1 |
| 5,757,860 | * 5/1998 | Shiota | 455/186.1 |
| 5,768,697 | * 6/1998 | Shirakawa | 455/181.1 |
| 5,815,170 | * 9/1998 | Kimura et al. | 455/186.1 |
| 5,819,166 | * 10/1998 | Kimura et al. | 455/186.1 |
| 5,867,776 | * 2/1999 | Noda | 455/186.1 |
| 5,898,910 | * 4/1999 | Miyake et al. | 455/186.1 |

FOREIGN PATENT DOCUMENTS

404126403 * 4/1992 (JP) .................................. 455/186.1

* cited by examiner

Primary Examiner—Lee Nguyen
Assistant Examiner—Simon Nguyen
(74) Attorney, Agent, or Firm—Jay H. Maioli

(57) ABSTRACT

A receiver includes a plurality of station-selecting keys arranged in parallel, each of which selects a broadcast frequency; a first memory part for memorizing information relating to the station selection of a plurality of broadcast frequencies capable of being received for each predetermined area; an area-selecting key for selecting and designating the area; a second memory part for memorizing and keeping information relating to the station selection of the plurality of broadcast frequencies in correspondence to each of the plurality of station-selecting keys; and a control circuit for memorizing the information relating to the station selection of the plurality of broadcast frequencies broadcasting the same broadcast program in the second memory part in such a way that the individual pieces of information are arranged near the plurality of station-selecting keys.

6 Claims, 8 Drawing Sheets

FIG. 1

| PRESET NUMBER | NAME OF BROADCASTING STATION | FREQUENCY |
|---|---|---|
| 1 | BROADCASTING STATION A | $f_A$ |
| 2 | BROADCASTING STATION B | $f_B$ |
| 3 | BROADCASTING STATION C | $f_C$ |
| 4 | BROADCASTING STATION D | $f_D$ |
| 5 | (VACANT) | |
| 6 | (VACANT) | |
| 7 | (VACANT) | |
| 8 | (VACANT) | |
| 9 | (VACANT) | |
| 10 | (VACANT) | |

| BROADCASTING STATION NAME | BASE FREQUENCY | SATELLITE FREQUENCY |
|---|---|---|
| BROADCASTING STATION A | A0 | A1, A2, A3 |
| BROADCASTING STATION B | B0 | B1, B2 |
| BROADCASTING STATION C | C0 | C1, C2, C3 |
| BROADCASTING STATION D | D0 | D1, D2 |

21

| PRESET No. | 1 | 2 | 3 | 4 | 5 | 6 | 7 | 8 | 9 | 10 |
|---|---|---|---|---|---|---|---|---|---|---|
| FREQUENCY | | | | | | | | | | |
| BROADCASTING STATION NAME | | | | | | | | | | |
| ELECTRIC FIELD INTENSITY | | | | | | | | | | |

FIG. 6A

| 1 | 2 | 3 | 4 | 5 | 6 | 7 | 8 | 9 | 10 |
|---|---|---|---|---|---|---|---|---|----|
| A0 | B0 | C0 | D0 | | | | | | |

FIG. 6B

| 1 | 2 | 3 | 4 | 5 | 6 | 7 | 8 | 9 | 10 |
|---|---|---|---|---|---|---|---|---|----|
| A0 | B0 | C0 | D0 | A1 | A2 | A3 | C1 | B2 | C2 |

FIG. 6C

| 1 | 2 | 3 | 4 | 5 | 6 | 7 | 8 | 9 | 10 |
|---|---|---|---|---|---|---|---|---|----|
| C0 | C1 | C2 | A0 | A1 | A2 | A3 | B0 | B1 | D0 |

FIG. 7

1 BROADCAST C
2 BROADCAST C
3 BROADCAST C
4 BROADCAST A
5 BROADCAST A
6 BROADCAST A
7 BROADCAST A
8 BROADCAST B
9 BROADCAST B
10 BROADCAST D

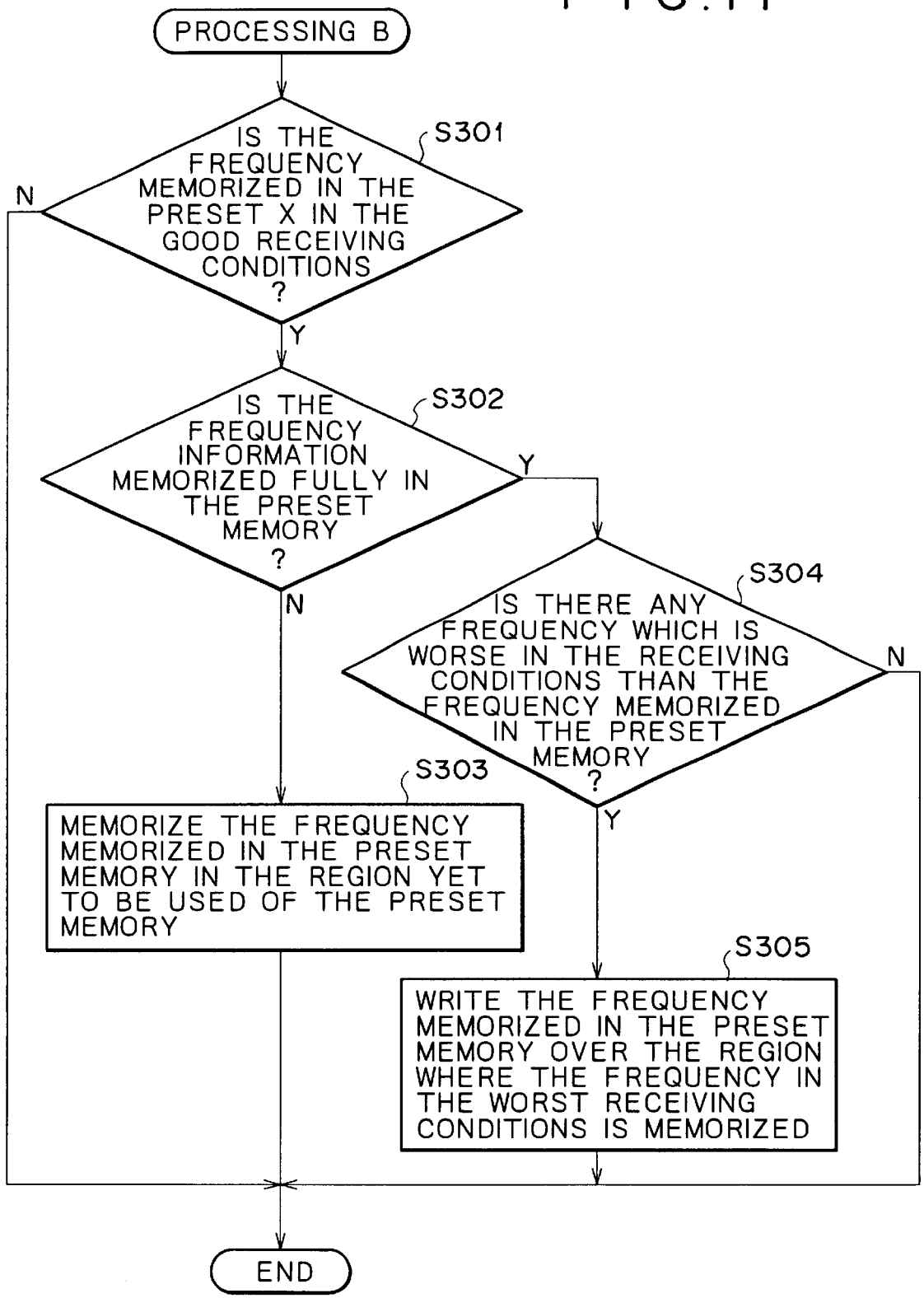

RECEIVER

BACKGROUND OF THE INVENTION

1. Field of the Invention

The present invention relates, for example, to a receiver suitable for a car-mounted radio receiver.

2. Description of Related Art

For example, the car-mounted radio receiver has been provided with the function of automatically memorizing station-selection information for selecting the frequency of the broadcast signal capable of being received in the area by designating an area where the radio receiver is used, what is called, an area call function (hereafter in the present specification referred to as "an area station-selection-information-setting function").

To realize this function, information relating to a station selection for each predetermined area comprising, for example, the name of broadcasting station for broadcasting a broadcast program capable of being received, the base frequency of the broadcasting station, and the frequency of the satellite station of the broadcasting station (hereinafter referred to as the "satellite frequency"), is memorized in the memory of the radio receiver and is supplied to a user.

When the above-mentioned function is performed in the radio receiver and the area where the radio receiver is used is selected by an operator, the basic frequency and the satellite frequency are selected automatically in sequence for each broadcasting station whose broadcast can be received in the area on the basis of the information relating to the station selection in the selected area, and the broadcast frequency which can be received in the best receiving conditions is detected for each broadcasting station.

Then, on the basis of the results of detection, the information relating to the station selection for selecting the broadcast frequency which can be received in the best conditions is selected for each broadcasting station and is memorized in a preset memory in correspondence to a station-selecting key. In this case, the station-selecting key corresponding to the information relating to the station selection is determined in advance for every broadcasting station, for example, as shown in FIG. 1, the first station-selecting key is for Broadcasting station A and the second station-selecting key is for broadcasting station B and so on.

In the case of FIG. 1, when the first station-selecting key is operated, the broadcast frequency of the Broadcasting station A is selected and when the second station-selecting key is operated, the broadcast frequency of the broadcasting station B is selected. In this way, the broadcast frequency of the objective broadcasting station corresponding to the station-selecting key is selected only by operating the station-selection operating key.

By the way, in the case of the above-mentioned area station-selection-information setting function, even if there is a broadcasting station that should broadcast a broadcast program capable of being received in the area designated by the operator, there is a case where the area is mountainous and hence the broadcast program can not be received in the good conditions.

Nevertheless, at least a piece of information for selecting the broadcast frequency of the broadcasting station is memorized in the preset memory in correspondence to the station-selecting key. Further, as described above, the station-selecting key corresponding to the station-selection information for selecting the broadcast frequency of the broadcasting station which should broadcast the broadcast program capable of being received in the area is determined in advance for every broadcasting station.

Therefore, for example, as shown in FIG. 1, even if the information for selecting the broadcast frequency of the broadcasting station whose broadcast can be received in the area is memorized in the preset memory in correspondence to the station-selecting key by means of the area station-selection-information-setting function, there are cases where only the broadcast frequencies of a Broadcasting station A and a broadcasting station D can be received in reality and the broadcast frequencies of a broadcasting station B and a broadcasting station C can not be received.

As described above, even if the information relating to station-selection is automatically memorized in the preset memory by use of the area station-selection-information-setting function, there are cases where it is difficult to find the station-selecting key corresponding to the memory in which the information relating to the station selection for selecting the broadcast frequency capable of being actually received is preset.

Further, for example, even if a broadcasting station has a plurality of different satellite frequencies in the area designated by the operator, only information relating to the station selection of the broadcast frequency which should be received in the best conditions is memorized in the preset memory.

However, if a car provided with the car-mounted radio receiver moves, there may be cases where the other different broadcast frequency of the same broadcasting station can be received in better conditions. In this case, the operator is required again to operate the area station-selection-information-setting function and to preset in the preset memory the information for selecting the broadcast frequency capable of being received. This is a cumbersome work for the operator.

In particular, in the case of the car-mounted radio receiver, as described above, if the broadcast frequency capable of being received can not be selected instantly or the information for selecting the broadcast frequency capable of being received is required to be preset again frequently, the radio receiver not only has a poor usability but also increases station-selection operations. This is a problem from the viewpoint of safety.

Further, the broadcast frequencies of the broadcasting stations A to D are preset in the preset recording region in the area where the broadcast frequencies shown in FIG. 1 are preset. That is, in FIG. 1, the broadcast frequencies of the broadcasting stations A to D are preset in the preset recording regions of preset numbers 1 to 4 and the preset recording regions of preset numbers 5 to 10 are vacant. In this way, the radio receiver has many vacant preset recording regions in some area and hence does not utilize the memory effectively.

SUMMARY OF THE INVENTION

In view of the above-mentioned circumstances, it is the object of the present invention to provide a radio receiver which can solve the above-mentioned problems and can precisely select the broadcast frequency capable of being received and has good operability.

According to the radio receiver of the information relating to a station selection memorized in a first memory part, the information relating to the station selection of a broadcast frequency capable of being received in an area selected by an operator is memorized by memory control means in a second memory part in such a way that the information corresponds to station-selecting keys operated by the operator.

In this case, the information relating to the station selection of a plurality of broadcast frequencies which are recognized to broadcast the same broadcast program on the basis of the results of recognition of recognition means is memorized in such a way that the pieces of the information are arranged near to each other along the direction in which the station-selecting keys are operated to change the station selection.

This makes it possible that the information relating to the station selection of the plurality of broadcast frequencies frequencies broadcasting the same broadcast program is memorized in the second memory part and that the information relating to the station selection is memorized in such a way that the pieces of the information correspond to the station-selecting keys arranged near to each other along the direction in which they are operated to change the station selection. Therefore, the broadcast frequencies broadcasting the same broadcast program can be selected simply and quickly.

Accordingly, for example, in the case where the receiver is used in the different area and the broadcast frequency being received becomes worse in receiving conditions, of the other broadcast frequencies broadcasting the same broadcast program, the broadcast frequency which is good in the receiving conditions can be selected quickly and simply.

According to the receiver, the goodness of the receiving conditions of each of a plurality of broadcast frequencies capable of being received in the area selected by the operator can be detected by detection means. The information relating to the station selection of the broadcast frequency broadcasting a different broadcast program is memorized by the memory control means in the second memory part in such a way that the information corresponds the station-selecting keys in the order of the better receiving conditions on the results of detection of the detection means.

This makes it possible that the information relating to the broadcasting stations having broadcast frequencies which are good in the receiving conditions is memorized in the second memory part in such a way that the information corresponds to the station-selecting keys in the order of the better receiving conditions. Therefore, the broadcast frequency of the broadcasting station whose broadcast is good in the receiving conditions can be selected quickly.

Accordingly, this can save effort and time in searching the broadcast frequency which is good in the receiving conditions.

According to the receiver, the information relating to the broadcast frequency broadcasting the same broadcast program is memorized by the memory control means in the second memory part in such a way that the information corresponds to the station-selecting keys in the order of the better receiving conditions on the basis of the results of detection of the detection means.

This makes it possible that the broadcast frequency which is the best in the receiving conditions can be selected quickly and simply. Further, the broadcast frequencies of each broadcasting station can be selected in the order of the better receiving conditions According to the receiver, the information relating to the station selection of a plurality of broadcast frequencies which are recognized to broadcast the same broadcast program on the basis of the results of recognition of recognition means is memorized by the memory control means in such a way that the pieces of the information are arranged near to each other along the direction in which the station-selecting keys are operated to change the station selection in the order of the better receiving conditions on the basis of the results of detection of the detection means.

This makes the information relating to the station selection for selecting the plurality of broadcast frequencies broadcasting the same broadcast program correspond to the station-selecting keys in the order of the better receiving conditions. Therefore, the broadcast frequency which is the best in the receiving conditions can be selected immediately for the broadcast frequencies of each broadcasting station, and the broadcast frequencies of each broadcasting station can be selected in the order of the better receiving conditions.

According to the receiver, the information relating to a plurality of broadcast frequencies broadcasting the same broadcast program is memorized in the second memory part in such a way that it is assigned to one station-selecting key.

This makes it possible that the broadcast frequencies broadcasting the same broadcast program assigned to one station-selecting key are selected in sequence by pressing down the one station-selecting key repeatedly. In this manner, since the information relating to the plurality of broadcast frequencies is assigned to one station-selecting key, it is possible to utilize effectively the station-selecting keys which are limited in number.

According to the receiver, of the information relating to the station selection memorized in the first memory part, the information relating to the station selection of the broadcast frequency capable of being received in the area selected by the operator by use of the area-selecting means is memorized in the second memory part in such a way that the information corresponds to the station-selecting keys operated by the operator.

In this case, the state of receiving of each of the plurality of broadcast frequencies of the area selected by the operator is detected by the detection means and the information relating to the station selection is memorized by the memory control means in the second memory part in such a way that the pieces of the information are arranged along the direction in which the station-selecting keys are operated to change the station selection in the order of the better receiving conditions.

This makes it possible that the broadcast frequencies are selected in the order of the better receiving conditions. That is, the broadcast frequency which can be received in actuality can be selected surely and quickly.

According to the receiver, the information relating to the station selection of the area selected by the operator by use of the area-selecting means is memorized in the second memory part in such a way that the pieces of the information are arranged along the direction in which the plurality of station-selecting keys are arranged in sequence in the order of the better receiving conditions.

This makes it possible that the broadcast frequencies are selected simply and quickly in the order of the better receiving conditions by changing the plurality of station-selecting keys arranged in sequence in the direction of arrangement thereof.

According to the receiver, the information relating to the station selection is memorized by the memory control means in the second memory part in such a way that the pieces of the information are arranged near to each other along the direction in which the station-selecting keys are operated to change the station selection in the order of the better receiving conditions and in the order of broadcast frequency broadcasting the same broadcast program on the basis of the goodness of the receiving conditions from the detection means and the results of recognition of the recognition means.

This makes it possible that the broadcast frequencies of the broadcasting station broadcasting the same broadcast program as the broadcast frequency are selected simply and quickly in the order of the better receiving conditions.

BRIEF DESCRIPTION OF THE DRAWINGS

FIG. 1 is an illustration of a conventional area station-selection-information-setting function.

FIG. 6 is an illustration of an area station-selection-information-setting function executed by the radio receiver of the present preferred embodiment.

FIG. 7 is an illustration of a display example of a station selection list displayed on the basis of the information memorized in a preset memory.

FIG. 11 is a flowchart for describing an area station-selection-information-setting function executed by the radio receiver of the present preferred embodiment.

DESCRIPTION OF THE PREFERRED EMBODIMENTS

One preferred embodiment of the receiver in accordance with the present invention will be described below with reference to the accompanying drawings.

In the preferred embodiment described below, a case will be described as an example in which the receiver in accordance with the present invention is applied to a car-mounted radio receiver. Further, the car-mounted radio receiver described below is provided with a function of automatically memorizing the information relating to the station selection of the broadcast frequency capable of being received in the area selected by a user (an operator) in the preset memory in correspondence to a station-selecting key, that is, an area station-selection-information-setting function.

Figure 2:
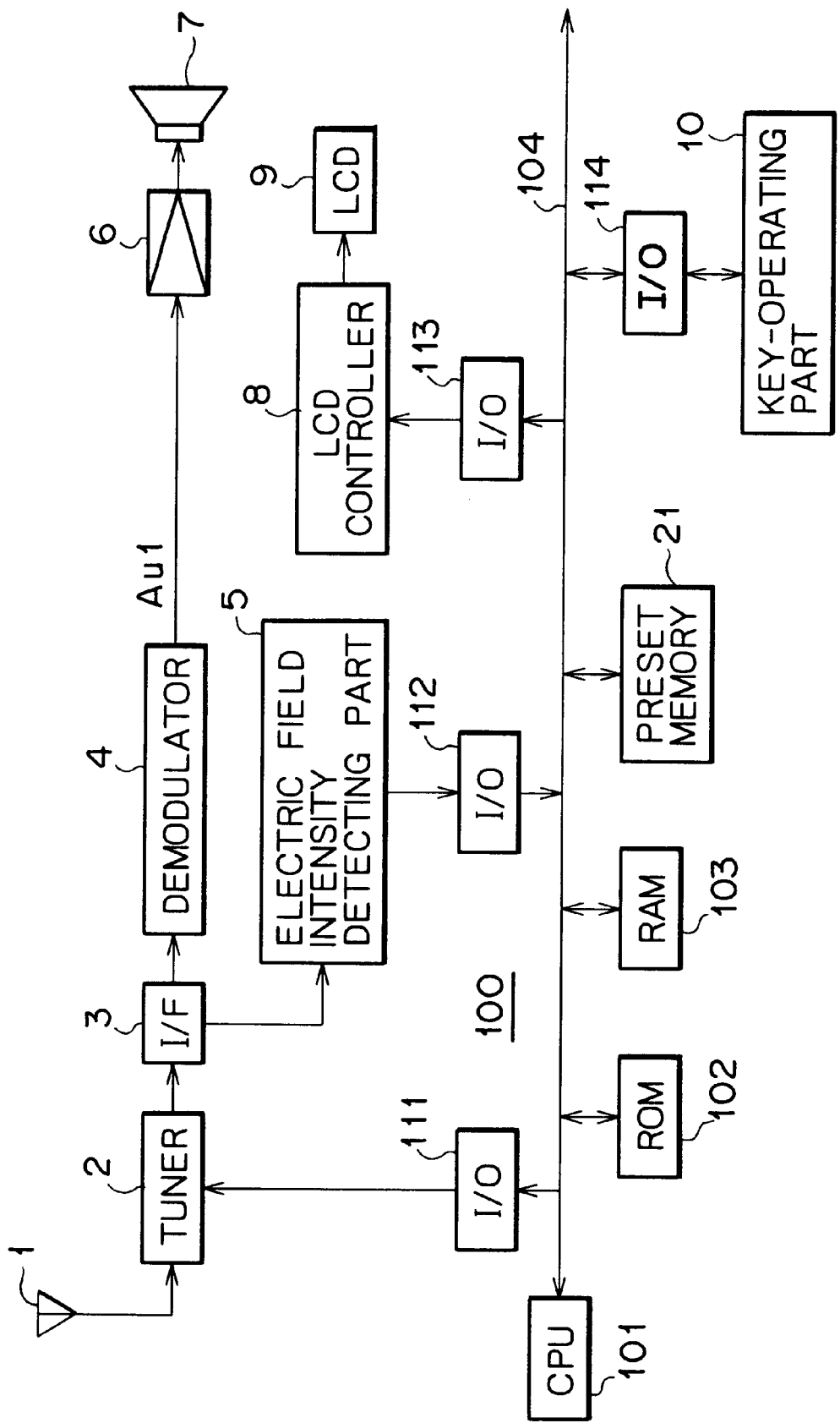
FIG. 2 is a block diagram for describing one preferred embodiment of the radio receiver to which a receiver according to the present invention is applied.
Figures 3, 4, 5:
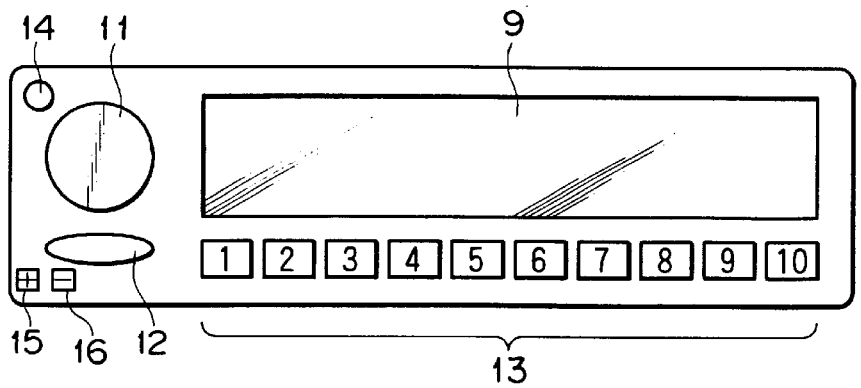
FIG. 3 is an external view of the radio receiver shown in FIG. 1.
FIG. 4 is an illustration of the information relating to the station selection supplied to each predetermined area.
FIG. 5 is an illustration of the information relating to the station selection memorized in a preset memory.

FIG. 2 is a block diagram for showing the car-mounted radio receiver (hereinafter referred to simply as a "radio receiver") of the present preferred embodiment. FIG. 3 is an external view of the radio receiver of the present preferred embodiment and shows the appearance of the radio receiver of the present preferred embodiment when it is viewed from the front panel side where various kinds of operating keys and LCDs (liquid crystal display) are arranged.

As shown in FIG. 2, the radio receiver of the present preferred embodiment is provided with an antenna 1, a tuner part 2, an intermediate frequency amplifying circuit 3 (described as IF in FIG. 2), a demodulation part 4, an electric field intensity detecting part 5, an amplifier 6, a speaker 7, an LCD controller 8, an LCD 9, a key-operating part 10, a preset memory 21, and a control circuit 100.

As shown in FIG. 2, I/O ports 111, 112, 113, and 114 are arranged between the parts of the tuner part 2, the electric field intensity detecting part 5, and the key-operating part 10, and the control circuit 100. These parts can receive or supply data from or to the control circuit 100 through the I/O ports 111, 112, 113, and 114.

The control circuit 100 for controlling the parts of the radio receiver of the present preferred invention is a microcomputer to which a CPU 101, a ROM 102, and a RAM 103 are connected by a system bus 104. In the present preferred embodiment, various kinds of programs and data required in various kinds of processes which are executed by the control circuit 100 are memorized in the ROM 102. Further, the RAM 103 is used as a working region for various kinds of processes executed in the radio receiver of the present preferred embodiment.

Further, in the present preferred embodiment, the information relating to the station selection of a plurality of broadcast frequencies capable of being received are memorized in the ROM 102 for every predetermined area so as to supply an area station-selection-information-setting function.

By use of the area station-selection-information-setting function, as described below in detail, of the information relating to the station selection memorized in the ROM 102, the information relating to the station selection of the broadcast frequency capable of being received in the area selected by the user can be automatically memorized in the preset memory 21 in correspondence to the station-selecting key of the key-operating part 10.

The key-operating part 10, as shown in FIG. 3, has a volume control dial 11 for controlling a sound level, a list key 12 for displaying menus in which processing capable of being executed are registered, and a group of station-selecting keys 13 having ten station-selecting keys arranged in parallel, and is also provided with a power supply switch 14 and an increment scanning execution key 15 and a decrement scanning execution key 16 which change the information relating to the station selection supplied to the tuner part 2 by the control circuit 100 in sequence at predetermined intervals of frequency to select the station and demodulate the information to pick up the broadcast signal capable of being received, that is, which execute a scanning.

The preset memory 21 is connected to the control circuit 100 through the system bus 104. In the preset memory 21, as described above, the information relating to the station selection of the broadcast frequency that should be capable of being received in the area selected by the user is memorized by use of the area station-selection-information-setting function in such a way that the pieces of information correspond to each of the station-selecting keys constituting the group of station-selecting keys 13.

Further, this preset memory 21 can memorize the information relating to each station selection selected by the user in correspondence to each station-selecting key of the group of station-selecting keys 13 without use of the area station-selection-information-setting function. In this respect, in the present preferred embodiment, the preset memory 21 can memorize ten pieces of information relating to the station selection in correspondence to the ten station-selecting keys of the group of station-selecting keys 13 by use of the area station-selection-information-setting function or in response to the setting operation of the user.

As described above, in the present preferred embodiment, the ROM 102 is the first memory part in which the information relating to the station selection is memorized and the preset memory 21 has a function as the second memory part for memorizing and keeping the information relating to the station selection in correspondence to the station-selecting key.

Further, in the present preferred embodiment, the electric field intensity detecting part 5 is what is called a RSSI (Radio Signal Strength Indicator) circuit and detects the received electric field intensity of a selected broadcast signal. The electric field intensity of a selected broadcast signal detected by the electric field intensity detecting part 5 is supplied to the control circuit 100. The control circuit 100 is adapted to detect the goodness of the receiving conditions of the selected station signal. The electric field intensity detecting part 5 has a function as a detecting means for detecting the goodness of the receiving conditions of each broadcast frequency. Further, the LCD 9 displays, for example, the name of the broadcasting station of the broadcast frequency in correspondence to the station-selecting key on the basis of the information relating to the station selection memorized in the preset memory 21 or various kinds of guidance messages such as the selected broadcast frequency and an alarm message. These are displayed on the LCD 9 by an LCD controller 8 controlled by the control circuit 100 through the I/O port 113.

The broadcast signal received by the antenna 1 is supplied to the tuner part 2. The tuner part 2 selects the broadcast signal of the objective broadcast frequency based on the station-selection information from the control circuit 100, for example, in response to the operation of the station-selecting key by the user and converts the selected broadcast signal into an intermediate frequency signal. The intermediate frequency signal is supplied to the demodulating part 4 and the electric field intensity detecting part 5 through the intermediate-frequency amplifying circuit 3.

In the present preferred embodiment, the tuner part 2 has a constitution of a tuner of what is called a synthesizer type and receives PLL data, that is, the data of frequency division ratio of the variable frequency-dividing circuit of a PLL loop and selects the broadcast signal of the objective broadcast frequency.

Therefore, for example, when the control circuit 100 selects the broadcast frequency corresponding to the operation of the station-selecting key, the control circuit 100 forms the data of frequency division ratio for selecting the broadcast frequency based on the information relating to the station selection memorized in the preset memory 21 in correspondence to the operated station-selecting key, for example, based on the information of the broadcast frequency and supplies them to the tuning part 2.

The demodulation part 4 performs a demodulation processing according to the demodulation method of the selected broadcast signal to form a signal Au1 and supplies it to an amplifier circuit 6. The amplifier circuit 6 amplifies the signal Au1 and supplies it to a speaker 7, whereby sounds according to the signal Au1 come out of the speaker 7.

On the other hand, the electric field intensity detecting part 5 detects the received electric field intensity of the broadcast signal selected by the tuner part 2 and supplies the results of detection to the control circuit 100 as digital signals through the I/O port 112. The electric field intensity detecting part 5 of the radio receiver of the present preferred embodiment is provided with an A/D conversion function for converting the results of detection of the received electric field intensity into the digital signals.

In the present preferred embodiment, as described below, the received electric field intensity detected by the electric field intensity detecting part 5 is used as the information for determining the order of arrangement of the information relating to the station selection when the information relating to the station selection capable of being received in the area selected by the user by use of the area station-selection-information-setting function is memorized in the preset memory 21 in correspondence to the station-selecting key. (About the area station-selection-information-setting function)

As described above, the radio receiver of the present preferred embodiment is provided with the ROM 102 in which the information for selecting a plurality of broadcast frequencies capable of being received is memorized previously for each predetermined area. Then, of the information relating to the station selection memorized in the ROM 102, the information relating to the station selection of the plurality of broadcast frequencies capable of being received in the area selected by the user can be memorized automatically in the preset memory 21 in correspondence to each station-selecting key of the group of station-selecting keys 13 by use of the area station-selection-information-setting function.

This makes it possible that the user of the radio receiver of the present preferred embodiment selects the objective broadcast frequency capable of being received in the area where he uses the radio receiver only by pressing down the station-selecting key without searching each broadcast frequency capable of being received.

FIG. 4 is an illustration of an example of the information relating to the station selection which is memorized in the ROM 102 and is supplied to the user in the radio receiver of the present preferred embodiment, and shows an example of the information relating to the station selection in one area in a plurality of areas which the user can select. Therefore, the information relating to the station selection is memorized in the ROM 102 for each predetermined area.

In the present preferred embodiment, the information relating to the station selection for each area comprises the base frequency or the satellite frequency of the broadcasting station broadcasting a broadcast program capable of being received in the area and the name of the broadcasting station broadcasting the broadcast program by use of those frequencies.

In this connection, the satellite frequency means a frequency used in the case where, for example, to make the broadcast of a broadcasting station (base station) capable of being received in a relatively wide area, the broadcast signal of the broadcasting station is received, amplified, and sent again by a relay station by use of a frequency different from the broadcast signal of the base station. In this respect, the frequency of the broadcast signal sent by the base station is the base frequency.

Therefore, a broadcast program of the same broadcasting station is broadcast at the same time by the base frequency of the broadcasting station and by the satellite frequency. Further, there are cases where one broadcasting station uses a plurality of relay stations and where one broadcasting station uses a plurality of satellite frequencies. In this way, a broadcasting via the plurality of relay stations makes it possible that the broadcast of the broadcasting station can be received in a wide area.

Therefore, there are cases where the broadcast program of the same broadcasting station can be received by the plurality of different broadcast frequencies and where even if the broadcast of the same broadcasting station is received, the broadcast frequency capable of being received in good conditions is different in the areas where the radio receiver is used.

In this way, the base frequency and the satellite frequency memorized in the ROM 102 are the broadcast frequencies capable of being received in the area. In the present preferred embodiment, as shown in FIG. 4, the base frequency and the satellite frequency are memorized together in the ROM 102 for each broadcasting station for broadcasting a broadcast program capable of being received in the area. This circumvents the need for memorizing the name of the broadcasting station for each frequency of the broadcasting station and hence the information relating to the station selection can be effectively memorized in the ROM 102.

In the case shown in FIG. 4, the broadcast programs of four broadcasting stations A, B, C, and D should be capable of being received in this area and the base frequencies of the broadcasting stations are A0, B0, C0, and D0. Further, as shown in FIG. 4, each broadcasting station has a plurality of satellite frequencies as follows: A1, A2, and A3 for broadcasting station A; B1 and B2 for broadcasting station B; C1, C2, and C3 for broadcasting station C; and D1 and D2 for broadcasting station D.

Therefore, in the area having the information relating to the station selection shown in FIG. 4, fourteen broadcast frequencies including the base frequencies and satellite frequencies can be received. However, in reality, all of these fourteen broadcast frequencies can not be received in the area. For example, there are cases where some broadcast frequencies can be received in the northern region of the area but can not be received in the southern region of the area, and vice versa.

Further, there are cases where the broadcast frequency capable of being received in good conditions changes when the broadcast program of the same broadcasting station is received in the different receiving area. In this way, the information relating to the station selection which is memorized in the ROM 102 and should be capable of being received in each predetermined area includes not only the broadcast frequencies capable of being received everywhere in the area but also the broadcast frequencies capable of being received only in a part of the area, and further, the broadcast frequencies capable of being received in the future.

In the case of radio receiver of the present preferred embodiment, the area station-selection-information-setting function is performed as follows. That is, in the present preferred embodiment, as shown in FIG. 3. a function list corresponding to the functions capable of being performed in the radio receiver is displayed on an LCD 9 by pressing down a list key 12 mounted on the front panel of the radio receiver. In the present preferred embodiment, when an input from the user is received, for example, when the function list is displayed, each station-selecting key of the group of station-selecting keys 13 can be used as an input key for receiving the input of information from the user.

The user selects and performs the area station-selection-information-setting function by use of the input-operating key and the station-selecting key. When the area station-selection-information setting function is selected, the control circuit 100 displays a list of selectable area on the LCD 9 on the basis of the information memorized in the ROM 102, and as is the case with the selection of the function, and hence the user selects and inputs the objective area by use of the station-selecting key used as the input key. In this way, in the present preferred embodiment, the station-selection operating key used as the input key is used as area-selecting means.

Then, the information for selecting the broadcast frequency which should be capable of being received in the area selected by the user is read out of the information relating to the station selection memorized in the ROM 102 by the control circuit 100 and is memorized in the preset memory 21 in correspondence to each station-selecting key of the group of station-selecting keys 13.

In this case, on the basis of the information relating to the station selection read out of the ROM 102, the control circuit 100 selects all of the base frequencies and the satellite frequencies of the broadcasting station broadcasting a broadcast program capable of being received in the area selected by the user, and the electric field intensity detecting part 5 detects the received electric field intensity of the broadcast signal supplied by each broadcast frequency.

Then, on the basis of the received electric field intensity of each broadcast frequency from the electric field intensity detecting part 5, the control circuit 100 detects if the broadcast frequency is the broadcast frequency capable of being received or not, and if there are a plurality of broadcast frequencies capable of being received in the base frequency and the satellite frequencies of the same broadcasting station, the information relating to the station selection of these plurality of broadcast frequencies capable of being received are memorized in the preset memory 21. In this case, the information relating to the station selection of the plurality of broadcast frequencies capable of being received are memorized in the preset memory 21 as far as the memory capacity of the preset memory 21 allows.

Further, in the radio receiver of the present preferred embodiment, as described below, on the basis of the received electric field intensity of the detected broadcast frequency, the control circuit 100 brings together the information relating to the station selection of the broadcast frequencies of the same broadcasting station broadcasting the same broadcast program and memorizes the information relating to the station selection in the order of the broadcasting station whose broadcast frequency is received in the better conditions in the preset memory 21 in such a way that the information relating to the station selection is arranged near to each other along the direction in which the station-selecting keys are operated to change the station selection. That is, the information relating to the station selection is memorized in the preset memory 21 in such a way that it is arranged in the order of better receiving conditions and in the order of broadcasting station and near to each other along the direction in which the station-selecting keys are operated to change the station selection. In this manner, in the present preferred embodiment, the control circuit 100 has a function as memory control means.

That is, in the present preferred embodiment, as described below, as shown in FIG. 7, the information relating to the station selection of the broadcasting station is memorized in the preset memory 21 in the order of the better receiving conditions for each broadcasting station in such a way that it corresponds to the station-selecting keys arranged near to each other along the direction in which they are operated to change the station selection, as follows: the broadcast frequencies of broadcasting station C capable of being received in the best conditions are arranged first, the broadcast frequencies of broadcasting station A capable of being received in the second-best conditions are arranged second, and so on. Further, the information relating to the station selection of the broadcast frequency of each broadcasting station is arranged in the order of the better receiving conditions.

In this connection, in the case of the radio receiver of the present preferred embodiment, each station-selecting key of the group of station-selecting keys, as shown in FIG. 3, is arranged on the front panel of the radio receiver in the lateral direction, and when the station selection is changed, the station-selection operating key operated in the lateral direction is changed in sequence. In this case, the direction in which the station-selecting key is operated to changes the station selection is the same as the direction in which the station-selecting keys are arranged (the lateral direction), and the information relating to the station selection is memorized in the preset memory 21 in correspondence to the station-selecting keys arranged near to each other along the direction in which the station-selecting keys are operated to change the station selection.

FIG. 5 is an illustration of the information memorized in the preset memory 21 of the radio receiver of the present preferred embodiment. In the present preferred embodiment, as described above, the received electric field intensity of each broadcast frequency is detected and the order of arranging the information relating to the station selection memorized in the preset memory 21 in correspondence to the station-selecting keys is determined by use of the received electric field intensity.

Therefore, as shown in FIG. 5, the broadcast frequency information capable of being received, the name of the broadcasting station of the broadcast frequency, and the received electric field intensity of each broadcast frequency are memorized in the preset memory 21 and can be rearranged by use of the received electric field intensity, the name of the broadcasting station or the like.

In this case, the broadcast frequency information includes the base frequency and the satellite frequency memorized in the ROM 102, and the name of the broadcasting station is the information memorized also in the ROM 102.

Further, the received electric field intensity, as described above, is detected for each broadcast frequency by the electric field intensity detecting part 5.

Next, processing will be described with reference to FIG. 4 which is performed in the radio receiver of the present preferred embodiment when the information relating to the station selection of the broadcast frequency capable of being received in the area selected by the user is memorized in the memory 21 in the predetermined order described above in correspondence to each station-selecting key of the group of station-selecting keys 13 by use of the information relating to the station selection memorized in the ROM 102 described above.

A case where the area having the information relating to the station selection shown in FIG. 4 is selected by the user will be hereinafter described by way of an example with reference to FIG. 6 of showing the state of the information relating to the station selection memorized in the preset memory 21. In this connection, as described in FIG. 5, although the broadcast frequency information, the name of broadcasting station and the received electric field intensity are memorized in the preset memory 21 as the information relating to the station selection, to make the description simple, memory sections for the name of broadcasting station and the received electric field intensity are omitted in FIG. 6.

In the present preferred embodiment, as described above, when the power supply switch 14 is operated and the area station-selection-information-setting function is executed by the user to select the objective area, the control circuit 100 reads out the information relating to the station selection of the broadcast frequency which should be capable of being received in the area selected by the user (see FIG. 4) and memorizes it temporarily in the RAM 103.

Then, the control circuit 100 initializes the memory region of the preset memory 21 and, as shown in FIG. 6A, transfers the information relating to the station selection having the base frequencies A0, B0, C0, and D0 of each broadcasting station which should be capable of being received in the area to the preset memory 21 and memorizes it. In this case, the information relating to the station selection having the base frequencies A0, B0, C0, and D0 is memorized in sequence from the first to the tenth memory regions made in the preset memory 21 in correspondence to each station-selecting key of the group of station-selecting keys 13.

In this respect, the first to the tenth memory regions made in the preset memory 21 in correspondence to each station-selecting key will be hereinafter described as a preset 1, a preset 2, and so on. Therefore, the preset 1 means the first memory region of the preset memory 21 for memorizing the information corresponding to the first station-selecting key, and the preset 2 means the second memory region of the preset memory 21 for memorizing the information corresponding to the second station-selecting key, and ditto for the preset 3 to the preset 10.

In the present preferred embodiment, as described above with reference to FIG. 4, since the satellite frequencies of each broadcasting station are memorized in the ROM 102 for each broadcasting station, the control circuit 100 can recognize exactly on the basis of the information relating to the station selection memorized in the ROM 102 which the broadcast frequency of the same broadcasting station for broadcasting the same broadcast program in the area is. In this manner, in the present preferred embodiment, the control circuit 100 has a function as means for recognizing the broadcast frequency of the same broadcasting station for broadcasting the same broadcast program on the basis of the information relating to the station selection memorized in the ROM 102.

The control circuit 100 selects in sequence the base frequency A0 of broadcasting station A and each broadcast frequency of the plurality of satellite frequencies A1 to A3 of broadcasting station A which are memorized in the preset 1 and detects the received electric field intensity of each broadcast frequency.

Then, as shown in FIG. 6A, the control circuit 100 compares the received electric field intensity of the broadcast frequency of the base frequency A0 of broadcasting station A memorized in the preset 1 of the preset memory 21 with the received electric field intensity of the broadcast frequency of the satellite frequency A1 of broadcasting station A to detect which received electric field intensity is larger and hence which frequency is better in the receiving conditions.

Then, of the two compared broadcast frequencies, the information relating to the station selection comprising the frequency information, the name of the broadcasting station, and the received electric field intensity of broadcast frequency in the better receiving conditions is memorized in the preset 1 of the preset memory 21.

Further, as for the other broadcast frequency, if the other broadcast frequency is not better in the receiving conditions than the broadcast frequency whose frequency information is memorized in the preset 1 but it is good in the receiving conditions to such an extent that the broadcast program can be heard when the broadcast frequency is demodulated, the information relating to the station selection of the other broadcast frequency is also memorized in the vacant regions of the preset memory 21.

In this case, the information relating to the station selection of the other broadcast frequency is memorized in the vacant regions after the preset 1 to the preset 4 where the base frequencies of each broadcasting station are memorized, that is, in the vacant memory regions of the preset 5 or thereafter. In this connection, if the information relating to the station selection is memorized to the preset 10 and hence there is no vacant memory region, the received electric field intensity of the other broadcast frequency is compared with the received electric field intensity of the information relating to the station selection memorized in the preset 5 to preset 10.

If there is a broadcast frequency which is weaker in the received electric field intensity, that is, worse in the receiving conditions than the other broadcast frequency, the information relating to the station selection of the other broadcast frequency is written over the memory region where the information relating to the station selection of the broadcast frequency in the worse receiving conditions is memorized. In this respect, if the information of the broadcast frequency which is weaker in the received electric field intensity than the other broadcast frequency is not memorized in the preset memory 21, the information relating to the station selection of the other broadcast frequency is not memorized in the preset 21.

In this manner, after the information memorized in the preset 1 is compared with the satellite frequency of broadcasting station A and is memorized in the preset memory 21, the same processing is performed for the broadcast frequencies of broadcasting station B, broadcasting station C and broadcasting station D.

That is, in the case of broadcasting station B, the received electric field intensity of the broadcast frequency whose information is memorized in the preset 2 is compared with the received electric field intensities of the broadcast frequencies of the satellite frequencies B1 and B2 of broadcasting station B, and in the case of broadcasting station C, the received electric field intensity of the broadcast frequency whose information is memorized in the preset 3 is compared with the received electric field intensities of the broadcast frequencies of the satellite frequencies C1, C2 and C3 of broadcasting station C. Further, in the case of broadcasting station D, the received electric field intensity of the broadcast frequency whose information is memorized in the preset 4 is compared with the received electric field intensities of the broadcast frequencies of the satellite frequencies D1 and D2 of broadcasting station D.

By this processing, as shown in FIG. 6B, of a plurality of broadcast frequencies of each of four broadcasting stations which should be capable of being received in the area selected by the user, the information relating to the station selection of the broadcast frequency which is judged to be in the best receiving conditions of each broadcasting station is memorized in the preset 1 to the preset 4 of the preset memory 21, respectively, and of the plurality of broadcast frequencies of each broadcasting station, the information relating to the station selection of the broadcast frequency which is in the relatively better receiving conditions is memorized in the preset 5 to the preset 10 of the preset memory 21, respectively.

As shown in FIG. 6B, this example is the case where, of the plurality of broadcast frequencies of each broadcasting station, the broadcast frequency of each base frequency is better in the receiving conditions than the broadcast frequency of the satellite frequency thereof.

As shown in FIG. 6B, assuming that, of the broadcast frequencies of each broadcasting station memorized in the preset memory 21, the received electric field intensities are C0>A0 >B0 >D0, for example, the control circuit 100 of the radio receiver of the present preferred embodiment rearranges the information relating to the station selection preset in the preset memory 21, as shown in FIG. 6C, in the order of the better receiving conditions and in the order of the broadcasting station on the basis of the received electric field intensity and the name of the broadcasting station. The information rearranged in this manner and memorized in the preset memory 21 is displayed on the LCD 9 of the radio receiver of the present preferred embodiment in such a way that it corresponds to the station-selecting key.

FIG. 7 shows a display example of a station selection list, that is, a list of broadcast frequencies capable of being received which are displayed on the LCD 9 of the radio receiver of the present preferred embodiment according to the information relating to the station selection preset in the preset memory 21 as shown in FIG. 6C. In FIG. 7, each of numerals 1 to 10, as shown in FIG. 3, corresponds to each station-selecting key designated by numerals 1 to 10 of the group of station-selecting keys 13. In this connection, as is evident from the contents of the memory of the preset memory 21 shown in FIG. 6C, the plurality of broadcast frequencies of the same broadcasting station, that is, of broadcasting station C designated by numerals 1 to 3, of broadcasting station A designated by numerals 4 to 7, and of broadcasting station B designated by numerals 8 and 9, are different in frequency from each other, respectively.

In this manner, in the case of the radio receiver of the present preferred embodiment, as described above, the information relating to the station selection of broadcasting station whose broadcast frequencies are capable of being received in the good conditions determined according to the received electric field intensity is gathered and is memorized in the preset memory 21 in such a way that it corresponds to the station-selecting keys arranged near to each other along the direction in which the station-selecting keys are operated to change the station selection. In this connection, the information relating to the station selection for each broadcasting station is also arranged in the order of the better receiving conditions.

In the case of FIG. 7, when the first station-selecting key designated by the number 1, of the station-selecting keys designated by the number 1 to number 10 shown in FIG. 3, is pressed down, the control circuit 100 forms the data of frequency division ratio for selecting the station on the basis of the base frequency C0 of broadcasting station C memorized in the preset memory 21 in correspondence to the first station-selecting key and supplies it to the tuner part 2. Then, the tuner part 2 selects the broadcast frequency of the base frequency C0 of broadcasting station C corresponding to the first station-selecting key.

Similarly, when the second station-selecting key is pressed down, the broadcast frequency of the satellite frequency C1 of broadcasting station C corresponding to the second station-selecting key can be selected, and when the third station-selecting key is pressed down, the broadcast frequency of the satellite frequency C2 of broadcasting station C corresponding to the third station-selecting key can be selected. In this manner, when the station-selecting key designated by the number 1 to 10 is pressed down, the broadcast frequency of the satellite frequency corresponding to the station-selecting key can be selected, respectively.

In this manner, the radio receiver of the present preferred embodiment can memorize the information relating to the station selection for selecting each of the plurality of broadcast frequencies which should be capable of being received in the area selected by the user in the area where the radio is used in the preset memory 21 in the order of better receiving conditions, in the group of broadcasting station, and in correspondence to the station-selecting key.

In this manner, the user can recognize quickly the broadcast frequency capable of being received in the good conditions, and hence it is easy to select the broadcast frequency capable of being received in the good conditions, which can improve the usability of the radio receiver.

Further, the information relating to the station selection of the plurality of broadcast frequencies capable of being received in the relatively good conditions is memorized for one broadcasting station in the preset memory 21.

This makes it possible that even if the broadcast frequency capable of being received in the good conditions is changed in the broadcast frequencies of the same broadcasting station when the car provided with the radio receiver moves, the broadcast frequency capable of being received in the good conditions can be selected by pressing down the station-selecting key to which the same broadcasting station is assigned and which is arranged near to the station-selecting key to which the information relating to the station selection of the broadcast frequency being selected at the present is assigned.

Next, processing in the case where the area station-selection-information-setting function of the radio receiver of the present preferred embodiment is executed will be described with reference to the flowcharts shown in FIG. 8 to FIG. 11.

Figure 8:
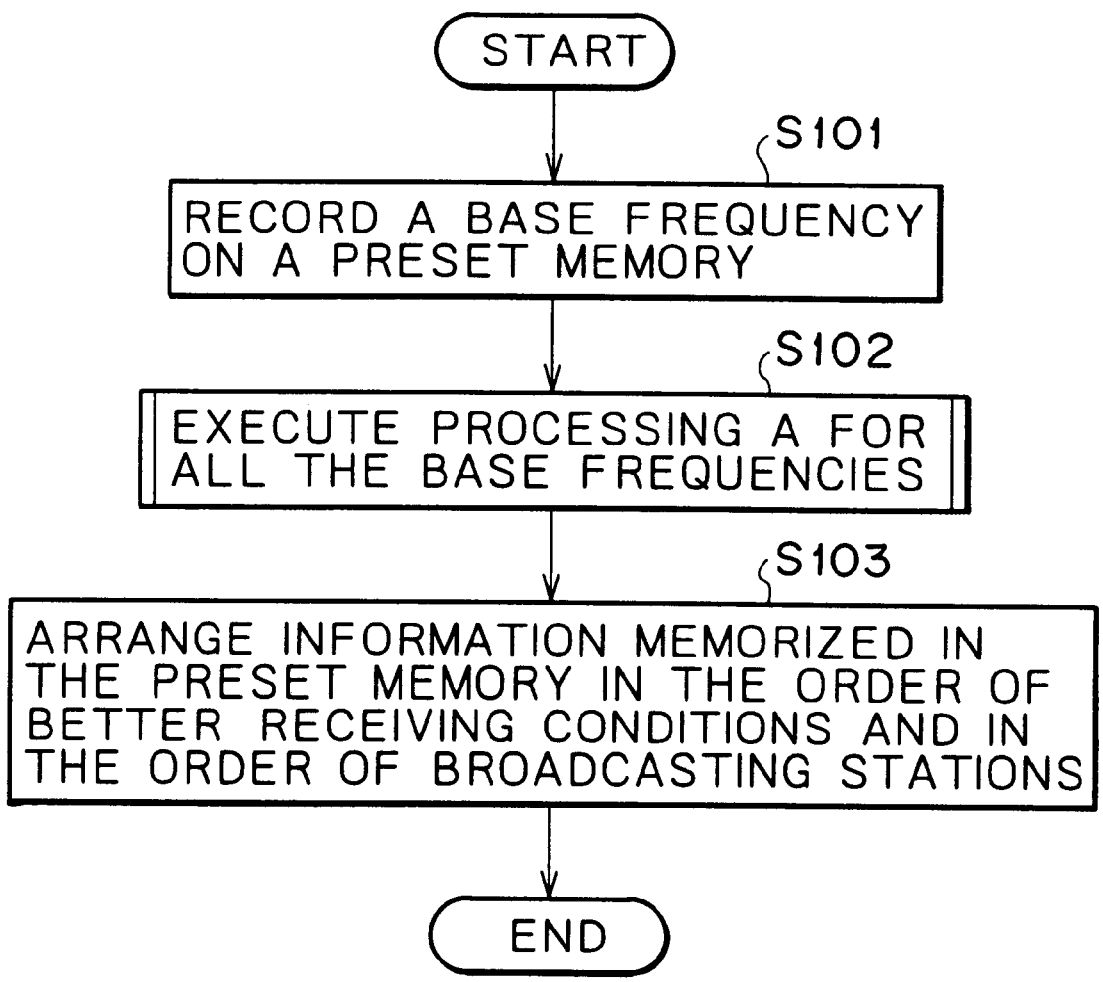
FIG. 8 is a flowchart for describing an area station-selection-information-setting function executed by the radio receiver of the present preferred embodiment.

FIG. 8 is a flowchart for describing processing executed by the control circuit 100 of the radio receiver of the present preferred embodiment after the area station-selection-information-setting function is selected from a list of functions displayed on the LCD 9, as described above, and the area is selected where the radio receiver is used by the user.

Figure 9:
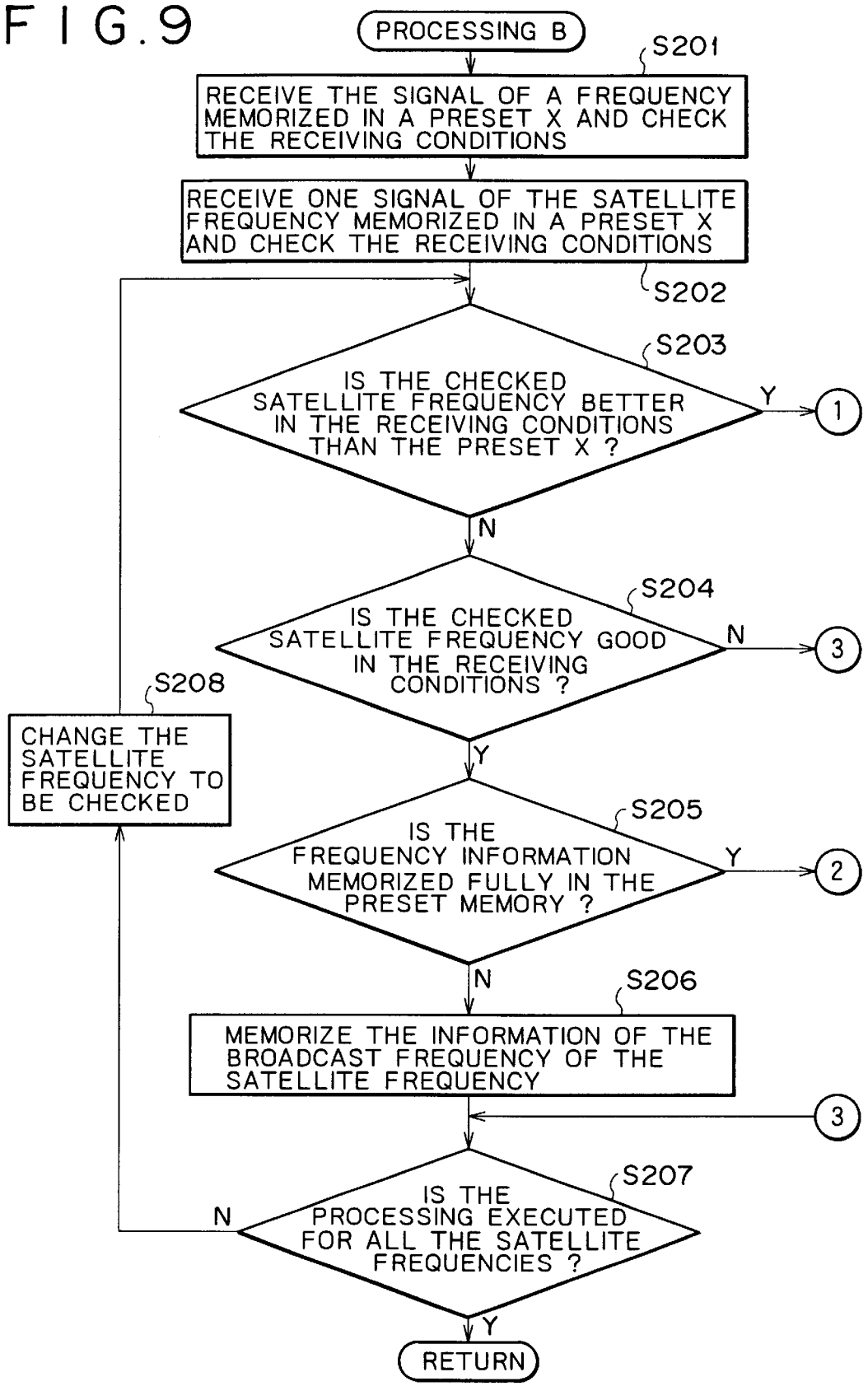
FIG. 9 is a flowchart for describing an area station-selection-information-setting function executed by the radio receiver of the present preferred embodiment.
Figure 10:
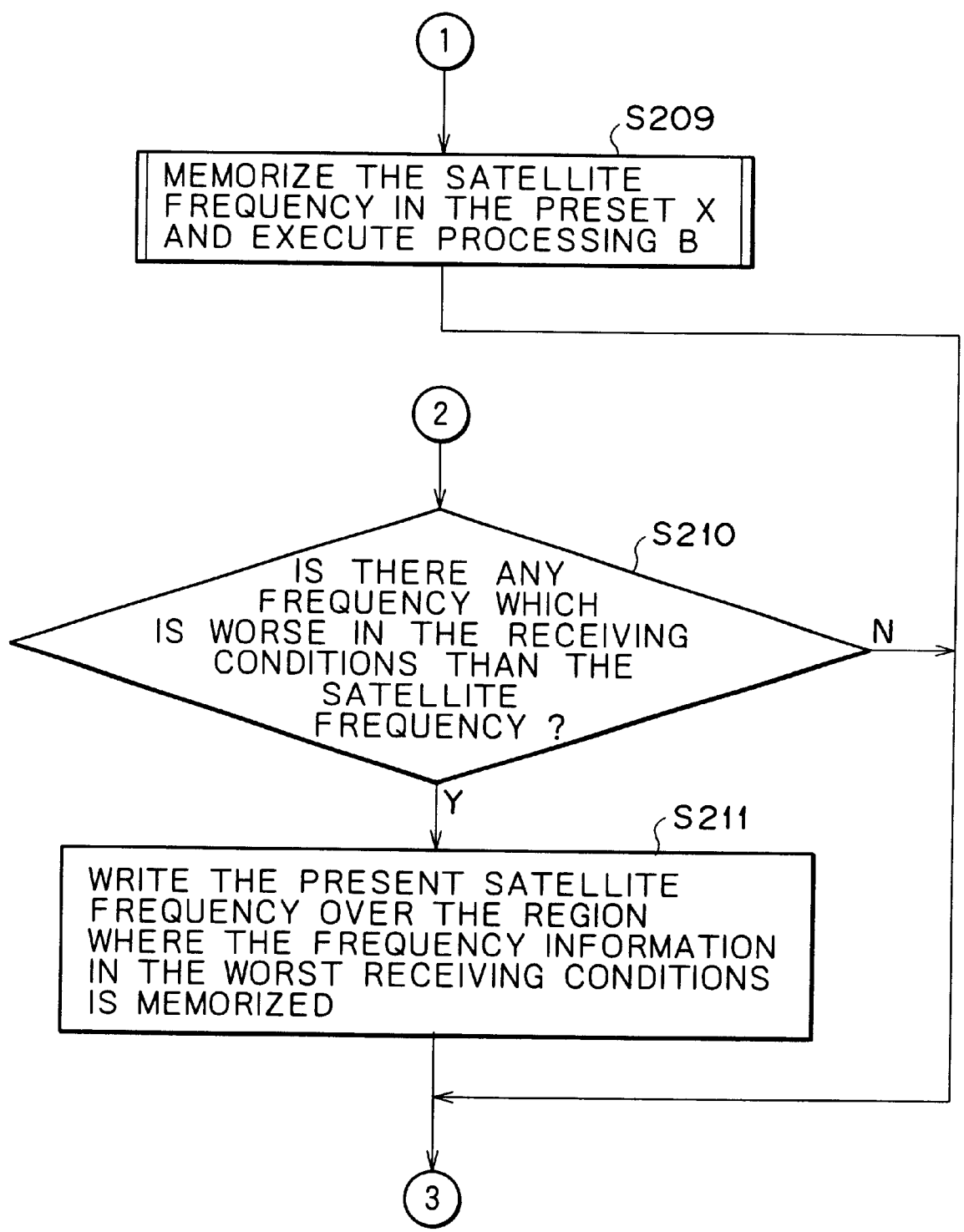
FIG. 10 is a flowchart following FIG. 9.

Further, FIG. 9 and FIG. 10 are flowcharts for describing processing executed in the step 102 of the flowchart shown in FIG. 8, and FIG. 11 is a flowchart for describing processing executed in the step 209 of the flowchart shown in FIG. 10.

When the area station-selection-information-setting function and the area where the radio receiver is used are selected by the user as described above, the control circuit 100 executes processing shown in FIG. 8. The control circuit 100 initializes the memory regions of the preset memory 21 and selects the information relating to the station selection of the broadcast frequency of the base frequency of the broadcasting station which should be capable of being received in the area from the information relating to the station selection of the broadcast frequency which should be capable of being received in the area selected by the user memorized in the ROM 102, and memorizes the information in the preset memory 21 in sequence from the preset 1 of the first memory region of the preset memory 21 (step S101).

The control circuit 100 executes processing A shown in FIG. 9 and FIG. 10 for the broadcast frequencies of all the base frequencies memorized in the preset memory 21 in sequence from the preset 1. In FIG. 9 and FIG. 10, a preset X designates the memory region of the preset memory 21 in which the information relating to the station selection of the base frequency is memorized and changes like a preset 1, a preset 2, and so on.

In the processing A shown in FIG. 9 and FIG. 10, the control circuit 100 receives the broadcast frequency whose information relating to the station selection is memorized in the preset X, or in the preset 1 for the first execution, in this case, the broadcast frequency of the base frequency, and detects the received electric field intensity of the broadcast frequency of the base frequency by the electric field intensity detecting part 5 and checks the receiving conditions of the broadcast frequency of the base frequency (step S201).

Then, the control circuit 100 recognizes the broadcast frequency of the satellite frequency of the same broadcasting station as the base frequency of the preset 1 on the basis of the information relating to the station selection of the ROM 102 and receives one of the recognized satellite frequency and checks the receiving conditions of the received satellite frequency (step S202). The receiving conditions of the step S202 are checked as is the case with the receiving conditions of the step S201.

Next, the control circuit 100 compares the receiving conditions of the broadcast frequency of the preset 1 checked in the step S201 with the receiving conditions of the satellite frequency checked in the step S202 and judges if the receiving conditions of the satellite frequency are better, or not (step S203)

When the control circuit 100 judges in the step S203 that the receiving conditions of the satellite frequency are not better, it judges whether the receiving conditions of the satellite frequency is good to such an extent that the satellite frequency can be heard when it is selected and demodulated, or not (step S204). The step S204 makes a judgment on whether the information relating to the station selection of the satellite frequency is to be memorized in the preset memory 21 or not.

When the control circuit 100 judges in the step S204 that the receiving conditions of the satellite frequency are relatively good, it judges if the information relating to the station selection such as frequency information is memorized in all the memory regions of the preset memory 21, or not (step S205).

When the control circuit 100 judges in the step S205 that the information is not memorized in all the memory regions of the preset memory 21 but there is a region yet to be used, it memorizes the information relating to the station selection of the satellite frequency in the region yet to be used of the preset memory 21 (step S206).

Then, the control circuit 100 judges whether the processing shown in FIG. 9 and FIG. 10 is finished for all the satellite frequencies of the broadcasting station of the broadcast frequency whose information relating to the station selection is memorized in the preset X, in this case, in the preset 1, or not (step S207).

When the control circuit 100 judges in the step S207 that the processing is finished for all the satellite frequencies of the broadcasting station, it finishes the processing shown in FIG. 9 and FIG. 10, and when it judges in the step S207 that the processing is not finished for all the satellite frequencies of the broadcasting station, it changes the satellite frequency to be checked to the next satellite frequency (step S208) and repeats the processing from the step S202

Further, when the control circuit 100 judges in the step S203 that the satellite frequency is in the better receiving conditions, as shown in FIG. 10, it memorizes the information relating to the station selection of the satellite frequency in the preset X, in this case, in the preset 1, and executes processing B shown in FIG. 11 (step S209). In this connection, the information relating to the station selection memorized in the preset X is temporarily memorized and held, for example, in the RAM 103.

The control circuit 100 judges in the processing B shown in FIG. 11 if the receiving conditions of the broadcast frequency whose information relating to the station selection are memorized in the preset 1 is good to such an extent that the broadcast frequency can be heard when it is selected and demodulated, or not (step S301). The step 301 makes a judgment on whether the information relating to the station selection memorized in the preset 1 is to be memorized in the preset memory 21, or not.

When the control circuit 100 judges in the step S301 that the receiving conditions of the broadcast frequency whose information relating to the station selection is memorized in the preset 1 are good, it judges if the information relating to the station selection such as frequency information is memorized in all the memory regions of the preset memory 21, or not (step S302).

When the control circuit 100 judges in the step S302 that the information is not memorized in all the memory regions of the preset memory 21 but there is a region yet to be used, it memorizes the information relating to the station selection memorized in the preset memory 1 in the region yet to be used of the preset memory 21 (step 303), and finishes the processing B shown in FIG. 11.

When the control circuit 100 judges in the step S302 that the information is memorized in all the memory regions of the preset memory 21 and there is not a region yet to be used, it judges if the information relating to the station selection of the broadcast frequency which is worse in the receiving conditions than the broadcast frequency whose information is memorized in the preset 1 is memorized in the memory regions behind the memory regions of the preset memory 21 in which the information relating to the station selection of the broadcast frequency of the base frequency is memorized, or not (step S304).

For example, as shown in FIG. 4, in the case where the broadcast of four broadcasting stations should be capable of being received in the area, as shown in FIG. 6, the information relating to the station selection of the broadcast frequency of the base frequency of the four broadcasting stations is memorized in the preset 1 to preset 4 and hence, in this case, it is judged if there is any frequency in the preset 5 to preset 10 which is worse in the receiving conditions than the broadcast frequency whose information is memorized in the preset X.

When the control circuit 100 judges in the step S304 that the information relating to the station selection of the broadcast frequency which is worse in the receiving conditions than the broadcast frequency whose information is memorized in the preset 1 is memorized, it writes the information relating to the station selection memorized in the preset 1 over the memory region where the information relating to the station selection of the broadcast frequency in the worst receiving conditions is memorized (S305) and finishes the processing B shown in FIG. 11.

When the control circuit 100 judges in the step S301 that the broadcast frequency whose information relating to the station selection is memorized in the preset 1 is not good in the receiving conditions, and judges in the step S301 that the information relating to the station selection of the broadcast frequency which is worse in the receiving conditions than the broadcast frequency whose information is memorized in the preset 1 is not memorized, and further, after the control circuit 100 finishes the steps S303 and S305, the control circuit 100 finishes the processing B shown in FIG. 11 and returns to the step S209 shown in FIG. 10 which calls the processing B and then executes the processing after the step S207 shown in FIG. 9.

Further, when the control circuit 100 judges in the step S204 that the satellite frequency is not good in the receiving conditions, that is, it is not necessary to memorize the information relating to the station selection of the broadcast frequency of the satellite frequency in the preset memory 21, the control circuit 100 executes the processing after the step S207 without memorizing the information relating to the station selection of the satellite frequency in the preset memory 21.

When the control circuit 100 judges in the step S205 that the information is fully memorized in the memory region of the preset memory 21 and hence there is not a memory region yet to be used, as shown in FIG. 10, the control circuit 100 judges if the information relating to the station selection of the broadcast frequency which is worse in the receiving conditions than the broadcast frequency of the satellite frequency to be compared is memorized in the memory regions behind the memory regions of the preset memory 21 where the information relating to the station selection of the broadcast frequency of the base frequency is memorized, or not (step S210).

When the control circuit 100 judges in the step S210 that the information relating to the broadcast frequency which is worse in the receiving conditions than the satellite frequency to be compared is memorized in the memory region of the preset memory 21, the control circuit 100 writes the information relating to the station selection of the satellite frequency over the memory region in which the information relating to the station selection of the broadcast frequency which is the worst in the receiving conditions is memorized and then executes the processing from the step S207 shown in FIG. 9.

When the control circuit 100 judges in the step S210 that the information relating to the broadcast frequency which is worse in the receiving conditions than the satellite frequency to be compared is not memorized in the memory region of the preset memory 21, the control circuit 100 does not memorize the information relating to the station selection of the satellite frequency in the preset memory 21 and then executes the processing from the step S207 shown in FIG. 9.

When the control circuit 100 finishes the processing shown in FIG. 9 to FIG. 11 for all the satellite frequencies of the same broadcasting station as the broadcast frequency of the base frequency memorized in the preset 1, as shown in the step S102 in FIG. 8, the control circuit 100 executes the processing shown in FIG. 9 to FIG. 11 on the basis of the broadcast frequency memorized in the preset 2 which is the broadcast frequency of the next base frequency. That is, the control circuit 100 changes the preset X in the order of the preset 1 to the preset 4 and executes the processing shown in FIG. 9 to FIG. 11 for the next broadcasting station in order.

When the control circuit 100 finishes the processing shown in FIG. 9 to FIG. 11 in this manner for the broadcasting station capable of being received in the area selected by the user, as shown in FIG. 6B, of the plurality of broadcast frequencies of the broadcasting station for broadcasting the broadcast programs capable of being received in the area, it memorizes the information relating to the station selection of the broadcast frequency capable of being received in the good conditions in the preset memory 21.

Then, the control circuit 100 returns to the step S102 shown in FIG. 8 and rearranges the information relating to station selection memorized in the preset memory 21 in the order of the better receiving conditions and in the order of the broadcasting station (step S103).

Then, the information relating to the station selection memorized in the preset memory 21 is rearranged in the order the better receiving conditions and in the order of the broadcasting station and can be memorized in such a way that the pieces of information are arranged near to each other along the direction in which the station-selecting key is operated to change the station selection.

In this manner, as described above, the user can quickly recognize the broadcast frequency capable of being received in the good conditions. Further, since the information relating to the station selection of the plurality of broadcast frequency capable of being received in the relatively good conditions can be memorized in the preset memory 21, even if the car mounted with the radio receiver moves and hence the broadcast frequency capable of being received in the good conditions changes in the broadcast frequencies of the same broadcasting station, the broadcast frequency of the objective broadcasting station capable of being received in the good conditions can be selected by operating the plurality of station-selecting keys which are arranged near to each other and to which the objective broadcasting station is assigned.

Further, when the car mounted with the radio receiver of the present preferred embodiment moves around a plurality of areas in which the broadcast frequency of capable of being received is different from each other, the information memorized in the preset memory 21 by the area station-selection-information-setting function can be used as an index for finding the broadcasting station capable of being received in the area.

In this case, if the predetermined area is too wide and hence a broadcast frequency incapable of being received in reality is mixed in the information displayed in the LCD 8 according to the information memorized in the preset memory 21 by use of the area station-selection-information-setting function, it is impossible to find the broadcast frequency capable of being received in reality.

However, in the case of the radio receiver of the present preferred embodiment, the information relating to the station selection of the broadcast frequency capable of being received in actuality is registered in the preset memory 21 in correspondence to the number of the station-selecting key in the order of smaller number and is displayed in that order and hence it is easy to find the broadcasting station capable of being received and to select the broadcast frequency capable of being received.

Further, if there are a few broadcasting stations for broadcasting the broadcast program capable of being received and the information relating to only one station selection is preset for each broadcasting station, the memory region of the preset memory 21 is left. However, since the radio receiver of the present preferred embodiment can memorize a plurality of pieces of information relating to the station selection of the broadcast frequency capable of being received for the same broadcasting station, it can use the preset memory effectively. (Modifications)

In the above-mentioned preferred embodiment, the information relating to the station selection of the broadcast frequency capable of being received in the area selected by the user is memorized in the preset memory 21 in the order of better receiving conditions and in the order of broadcasting station and in correspondence to the station-selecting keys which are arranged near to each other along the direction in which the station-selecting keys are operated to change the station selection. However, the information relating to the station selection may be arranged in the following order.

For example, the information relating to the station selection may be arranged only in the order of broadcasting station. As described above, although the information relating to the station selection of the broadcast frequency capable of being received in the good conditions is memorized in the preset memory 21, the information relating to the station selection is gathered only for the same broadcasting station independently of the receiving conditions.

In this case, since the information of the broadcast frequency of at least the same broadcasting station is gathered and can be made to correspond to the station-selecting keys which are arranged near to each other in the direction in which the station-selecting keys are operated to change the station selection, it is possible to recognize immediately the station-selecting key whose broadcast frequency corresponds to the objective broadcast frequency and to select the broadcast frequency of the objective broadcasting station. Further, if the selected broadcast frequency is not good in the receiving conditions, the broadcast frequency capable of being received in the good conditions of the broadcast frequencies of the objective broadcasting station can be selected by operating the station-selecting keys which are arranged near to each other and to which the broadcast frequencies of the same broadcasting station are made to correspond.

Further, even if the broadcast frequency of the objective broadcasting station is not good in the receiving conditions or can not be received, the broadcast frequency of the other broadcasting station can be selected smoothly because the information relating to the station selection is gathered for each broadcasting station.

Further, as described above, the information relating to the station selection may be arranged in the order of the broadcasting station and in the order of better receiving conditions. In this case, the broadcast frequencies of the objective broadcasting station can be selected in the order of the better receiving conditions.

Therefore, in this case, the broadcast frequency which should be the best in the receiving conditions is selected for the objective broadcasting station and when the selected broadcast frequency is not so good in the receiving conditions, the other broadcast frequency of the same broadcasting station which is worse in the receiving conditions is not selected but the broadcast frequency of the other broadcasting station can be selected. This can circumvent a needless station-selection operation.

Further, in the preferred embodiment described above, for one broadcasting station, the information relating to the station selection of absolutely one broadcast frequency is memorized in the preset memory but there may be cases where some broadcast frequency can be received in actuality. Therefore, it is also possible that if there is not a broadcast frequency which is good in the receiving conditions, a broadcast frequency is not memorized in the preset memory. That is, of all the base frequencies and satellite frequencies, the information relating to the station selection of the broadcast frequency which is good in the receiving conditions may be memorized in the preset memory.

Further, it is also possible that the broadcast frequencies of the same broadcasting station are not gathered but that, of the broadcast frequencies of each broadcasting station which should be capable of being received, the information relating to the station selection of the broadcast frequency which is the best in the receiving conditions is first memorized in the starting region of the preset memory and then the information relating to the station selection of the broadcast frequency next to be selected is memorized in the next region of the preset memory.

In this case, of the broadcast frequencies of each broadcasting stations, the information relating to the station selection of the broadcast frequency which should be best in the receiving conditions may be memorized in the order of better receiving conditions. Further, it is also possible that the information relating to the station selection of the other broadcast frequency next to be selected is memorized in the order of the better receiving conditions or is arranged in the order of the station and further that the information relating to the station selection of the broadcast frequency is arranged in the order of the better receiving conditions.

In this manner, when the information relating to the station selection of the broadcast frequency which should be best in the receiving conditions is first memorized in the preset memory, the station selection list displayed on the basis of the information memorized in the preset memory can be used as the list of receivable broadcasting stations.

Further, the information relating to the station selection may be memorized in the preset memory to the fullest memory capacity in the order of better receiving conditions in correspondence to the station-selecting keys independently of the base frequencies and the satellite frequencies. In this case, the broadcast frequency can be selected in the order of the better receiving conditions and hence the broadcast frequency capable of being received in the better conditions can be selected with certainty.

Further, although the information relating to the station selection of one broadcast frequency is made to correspond to one station-selecting key in the preferred embodiment described above, it is not intended to limit the present invention to this preferred embodiment. For example, all the information relating to the station selection of the plurality of broadcast frequencies of the same broadcasting station may be made to correspond to one station-selecting key. In this case, it is recommended that the information relating to the station selection memorized in the preset memory be memorized hierarchically. Also in this case, the information relating to each station selection is memorized, for example, in the order of the better receiving conditions.

This makes it possible that, for example, a first station-selecting key is operated to select one broadcasting station and the first station-selecting key is operated again within several seconds (for example, within two seconds) to select the other broadcast frequency of the same broadcasting station.

In this case, since the broadcast frequency is selected from the same broadcasting station and hence the same broadcast program is broadcast, to clearly inform the user of that the selected broadcast frequency is changed, it is also recommended that the broadcast sound be muted shortly when the station selection is changed or before the broadcast frequency is returned to the original broadcast frequency after the station selection is changed.

In this case, to change the station selection, the station-selecting key is pressed down for the broadcast frequency of the same broadcasting station. Therefore, memorizing the information relating to the station selection in the preset memory 21 in such a way that the pieces of information are arranged near to each other along the direction in which the station-selecting keys are operated to change the station selection includes the cases where the information relating to the station selection is memorized in the preset memory such that one station-selecting key is made to correspond to a plurality of broadcast frequencies and the information relating to the station selection of the different broadcast frequencies can be read out by pressing down the same station-selecting key.

Further, it is also possible to select the broadcast frequency in the better receiving conditions and in the order of the broadcasting station by operating one station-selecting key without operating the different station-selecting key for each broadcasting station.

In this respect, in the preferred embodiment described above, it has been described that the information relating to the station selection includes the frequency information, the name of broadcasting station, and the received electric field intensity but it is not limited to these. For example, instead of the frequency information, the data of frequency division ratio corresponding to the frequency maybe included. In this case, the data of frequency division ratio memorized in the preset memory can be supplied as they are to the tuner part 2 as the station selection information.

Further, the name of the broadcasting station is not necessarily required and it is possible that the specific broadcasting station ID of each broadcasting station for identifying the broadcasting station is used as one piece of information relating to the station selection and that the name of the broadcasting station is obtained from the data of the name of the broadcasting station which are prepared in a different way on the basis of the broadcasting station ID and is displayed on the list of station selection.

Further, it is also possible that, for example, a broadcast frequency ID for identifying the broadcast frequency and the received electric field intensity are used as the information relating to the station selection and that the data of frequency division ratio and the name of broadcasting station as the station selection information are obtained from the broadcast frequency data prepared in a different way.

Therefore, only the broadcast frequency ID for identifying the broadcast frequency which should be capable of being received in the area selected by the user is required at the minimum as the information relating to the station selection prepared previously in the ROM 102, and only the broadcast frequency ID and the received electric field intensity are required as the information relating to the station selection memorized in the preset memory.

In this case, it is essential only that the data of the frequency division ratio and the name of the broadcasting station which are used for selecting the station can be obtained on the basis of the broadcast frequency ID.

Further, it has been described in the preferred embodiment described above that in the case where the same broadcasting station has the plurality of broadcast frequencies, the control circuit 100 recognizes the broadcast frequency of the same broadcasting station which broadcasts the same broadcast program on the basis of the information relating to the station selection of each predetermined area memorized in the ROM 102. However, for example, if the information of the base station is added to the broadcast signal, the broadcast frequency of the same broadcasting station which broadcasts the same broadcast program can be recognized on the basis of the information of the base station added to the broadcast signal.

Therefore, in the case where the information of the base station is added to the broadcast signal, the control circuit 100 can recognize the broadcast frequency of the same broadcasting station which broadcasts the same broadcast program, for example, by providing an addition-information-extracting circuit for extracting the information of the base station from the broadcast signal which is received and demodulated and by supplying the information of the base station extracted from the addition-information-extracting circuit to the control circuit 100. In this manner, the control circuit 100 can also recognize the broadcast frequency of the same broadcasting station which broadcasts the same broadcast program on the basis of the information added to the selected broadcast signal.

Further, it has been described in the preferred embodiment that the ROM 102 is supplied in which the information relating to the station selection of the plurality of broadcast frequencies capable of being received is memorized, but it is not limited to this. It is also possible that the radio receiver may be mounted with a memory designed especially for the information relating to the station selection or that the radio receiver may be mounted with a memory card interface so that a memory card in which the information relating to the station selection is memorized can be used for the radio receiver.

Further, the station-selecting keys are not limited to the keys arranged in one row laterally as is described in the above-mentioned preferred embodiment, but the station-selecting keys having the plurality of rows or columns like the ten-key numerical pad of a handy calculator or the dial key of a cellular phone, for example, may be used of course. Further, the number of keys is not limited to ten but it can be increased or decreased in consideration of the space where they are arranged.

Further, it is of course possible to provide the radio receiver with an independent operating key as area-selecting means and it is also possible to constitute the station-selecting keys and the area-selecting means as software keys by attaching a touch panel to the LCD 8 and by using the touch panel and the display information of the LCD 8.

Further, it is of course possible that the radio receiver can be operated by use of a remote command (remote control) and that the remote control is provided with the operating keys as the station-selecting keys and the area-selecting means.

Further, it is of course possible that the radio receiver according to the present invention is applied to a car-mounted radio receiver which is combined or integrated with a unit for reproducing a cassette tape, a CD (compact disc) and a MD (mini disc), or a car navigation system.

Further, the radio receiver according to the present invention can be applied not only to the car-mounted radio receiver but also the various kinds of portable receivers and the various kinds of tabletop receivers. Further, the present invention can be applied to a television set.

(Effects of the Invention)

As described above, according to the radio receiver of the present invention, the information relating to the station selection of the plurality of broadcast frequencies for broadcasting the same broadcast program can be memorized in the second memory region and the information relating to the station selection is made to correspond to the station-selecting keys which are arranged in the direction of the operation of changing the station selection, and hence the broadcast frequency broadcasting the same broadcast program can be selected simply and quickly. Therefore, when the radio receiver is used in the different areas and the broadcast frequency being received becomes worse in the receiving conditions, of the other broadcast frequencies broadcasting the same broadcast program, the broadcast frequency capable of being received in the good conditions can be selected simply and quickly.

Further, according to the radio receiver of the present invention, the information relating to the station selection of the broadcasting station having the broadcast frequency capable of being received in the good conditions are memorized in the second memory region in the order of better receiving conditions in such a way that the information corresponds to the station-selecting key and hence the broadcast frequency of the broadcasting station broadcasting the broadcast program in better receiving conditions can be selected quickly. This makes it possible to save an expense in effort and time for searching the broadcast frequency capable of being received in the good conditions and to select the broadcast frequency capable of being received in the good conditions.

Further, according to the radio receiver of the present invention, the broadcast frequency capable of being received in the best conditions can be selected quickly and simply. Furthermore, the broadcast frequencies of each broadcasting station can be selected in the order of the better receiving conditions.

Further, according to the radio receiver of the present invention, the information relating to the station selection for selecting the plurality of broadcast frequencies broadcasting the same broadcast program is made to correspond to the station-selecting keys in the order of the better receiving conditions. This makes it possible to select the broadcast frequency capable of being received in the best conditions of the broadcast frequencies of each broadcasting station. Further, this makes it possible to select the broadcast frequencies of the broadcasting station in the order of the better receiving conditions.

Further, according to the radio receiver of the present invention, it is possible by operating one station-selecting key to select in sequence the broadcast frequencies of the broadcasting station which is assigned to the station-selecting key and broadcasts the same broadcast program. Furthermore, since a plurality of information relating to the station selection can be assigned to one station-selecting key, it is possible to effectively utilize the station-selecting keys which are limited in number.

Further, according to the radio receiver of the present invention, it is possible to select the broadcast frequencies in the order of the better receiving conditions. Therefore, it is possible to select with certainty and quickly the broadcast frequency capable of being received in actuality.

Further, according to the radio receiver of the present invention, it is possible to select the broadcast frequencies in the order of the better receiving conditions simply and exactly by operating the plurality of station-selecting keys arranged in order in the direction of arrangement.

Further, according to the radio receiver of the present invention, it is possible to select simply and exactly the broadcast frequencies of the broadcasting station broadcasting the same broadcast program as the broadcast frequency capable of being received in the good conditions in the order of the better receiving conditions. Further, according to the radio receiver of the present invention it is possible to reduce the vacant region of the recording region of the memory and to utilize the recording region effectively.

What is claimed is:

1. A receiver, comprising:

a plurality of station-selecting keys for selecting broadcast frequencies;

a first memory part for memorizing information relating to a station selection of a plurality of broadcast frequencies capable of being received for each selected area;

area-selecting means for selecting, designating, and inputting the area;

a second memory part for memorizing and keeping the information relating to the station selection of the plurality of broadcast frequencies so that the information corresponds to the plurality of station-selecting keys;

recognition means for recognizing a broadcast frequency broadcasting a same broadcast program in the area selected by the area-selecting means;

memory control means for memorizing the information relating to the station selection of the plurality of broadcast frequencies capable of being received in the area selected and designated by the area-selecting means in the second memory part so that pieces of the information relating to the station selection of the plurality of broadcast frequencies broadcasting the same broadcast program are arranged near each other along a direction in which the plurality of station-selecting keys are operated to change the station selection based on results of a recognition of the recognizing means; and detection means for detecting a quality of receiving conditions of each of the plurality of broadcast frequencies capable of being received in the area selected by the area-selecting means, wherein the memory control means memorizes the information relating to the station selection of the plurality of broadcast frequencies broadcasting different broadcast programs in the second memory part in order of better receiving conditions based on results of detection of the detection means, and memorizes the information relating to the station selection of the plurality of broadcast frequencies broadcasting the same broadcast programs in vacant regions of the second memory part in order of better receiving conditions based on detection quality results of the detection means.

2. A receiver, comprising:

a plurality of station-selecting keys arranged in parallel, each of which selects a respective broadcast frequency;

a first memory part for memorizing information relating to a station selection of a plurality of broadcast frequencies capable of being received for each selected area;

area-selecting means for selecting, designating, and inputting the area;

a second memory part for memorizing and keeping the information relating to the station selection of the plurality of broadcast frequencies so that each piece of the information corresponds to each of the plurality of station-selecting keys;

recognition means for recognizing the broadcast frequency broadcasting a same broadcast program in the area selected by the area-selecting means;

memory control means for memorizing the information relating to the station selection of the plurality of broadcast frequencies capable of being received in the area selected and designated by the area-selecting means in the second memory part so that pieces of the information relating to the station selection of the plurality of broadcast frequencies broadcasting the same broadcast program are arranged near the plurality of station-selecting keys based on results of recognition of the recognition means; and detection means for detecting a quality of receiving conditions of each of the plurality of broadcast frequencies capable of being received in the area selected by the area-selecting means, wherein the memory control means memorizes the information relating to the station selection of the plurality of broadcast frequencies broadcasting different broadcast programs in the second memory part in order of better receiving conditions based on results of detection of the detection means, and memorizes the information relating to the station selection of the plurality of broadcast frequencies broadcasting the same broadcast programs in vacant regions of the second memory part in order of better receiving conditions based on detection quality results of the detection means.

3. The receiver as claimed in claim 1 or 2, wherein the memory control means memorizes the information relating to the station selection of the plurality of broadcast frequencies broadcasting the same broadcast program in the second memory part so that the information can be called up by operating a same station-selecting key.

4. A receiver comprising:

a plurality of station-selecting keys operated by an operator;

a first memory part for memorizing information relating to a station selection of a plurality of broadcast frequencies capable of being received for each selected area;

area-selecting means by which the operator selects, designates, and inputs the area;

a second memory part for memorizing and keeping the information relating to the station selection of the plurality of broadcast frequencies so that the information corresponds to the plurality of station-selecting keys;

detection means for detecting a quality of receiving conditions of each of the plurality of broadcast frequencies capable of being received in the area selected by the operator of the area-selecting means; and memory control means for memorizing the information relating to the station selection of the plurality of broadcast frequencies capable of being received in the area selected and designated by the area-selecting means in the second memory part so that pieces of the information relating to the station selection of the plurality of broadcast frequencies are arranged in order of better receiving conditions along a direction in which the plurality of station-selecting keys are operated to change the station selection based on results of detection of the detection means, wherein different broadcast programs are arranged first, and the same broadcast programs are memorized thereafter in vacant regions of the second memory part.

5. The receiver as claimed in claim 4, wherein the plurality of station-selecting keys comprise a plurality of operating keys arranged in sequence, and wherein the memory control means memorizes the information relating to the station selection of the plurality of broadcast frequencies capable of being received in the area selected by the operator of the area-selecting means in the second memory part in such a way that the respective pieces of the information are assigned to the plurality of operating keys in the direction of arrangement thereof and in the order of the better receiving conditions.

6. The receiver as claimed in claim 4 or 5, further comprising recognition means for recognizing the broadcast frequency broadcasting a same broadcast program in the area selected by the operator of the area-selecting means, wherein the memory control means memorizes the information relating to the station selection of the broadcast frequency broadcasting the same broadcast program in the second memory part in such a way that the respective pieces of the information are arranged near each other in the direction in which the plurality of station-selecting keys are operated to change the station selection based on results of recognition of the recognition means.

* * * * *